(12) United States Patent
Meyer et al.

(10) Patent No.: US 7,596,969 B2
(45) Date of Patent: Oct. 6, 2009

(54) MOLD SUPPORT MECHANISM FOR AN I. S. MACHINE

(75) Inventors: Willi Meyer, Effretikon (CH); Thomas Mueller, Cham (CH)

(73) Assignee: Emhart Glass S.A., Cham (CH)

(*) Notice: Subject to any disclaimer, the term of this patent is extended or adjusted under 35 U.S.C. 154(b) by 1615 days.

(21) Appl. No.: 10/424,510

(22) Filed: Apr. 28, 2003

(65) Prior Publication Data

US 2006/0117796 A1   Jun. 8, 2006

(51) Int. Cl.
*C03B 9/353* (2006.01)
(52) U.S. Cl. .......................................... 65/359; 65/357
(58) Field of Classification Search ............... 65/357, 65/359
See application file for complete search history.

(56) References Cited

U.S. PATENT DOCUMENTS 4,361,434 A   11/1982   Schneider 4,969,945 A * 11/1990 Mehling et al. ............... 65/323
5,938,809 A    8/1999 Mungovan et al.
5,964,915 A * 10/1999 Neuman et al. ............... 65/214

FOREIGN PATENT DOCUMENTS

| GB | 2175296 A | 11/1986 |
|----|-----------|---------|
| JP | 08283027 A2 | 10/1996 |
| WO | 0153224 A1 | 7/2001 |

* cited by examiner

*Primary Examiner*—Steven P Griffin
*Assistant Examiner*—Queenie Dehghan
(74) *Attorney, Agent, or Firm*—Reinhart Boerner Van Deuren S.C.

(57) ABSTRACT

A mold open and close mechanism uses the hook of a blank mold half and the associated ridges of the upper mold support hanger to maintain the blank mold half on the mold but defines a vertical locating structure for placing the bottom surface of the blank mold half on the top horizontal surface of the lower mold support hanger with a vertical space between the hook of the blank mold half and the upper mold support hanger.

3 Claims, 4 Drawing Sheets

MOLD SUPPORT MECHANISM FOR AN I. S. MACHINE

This invention relates to a mold mechanism at a blank station of an I. S. type glassware forming machine.

BACKGROUND OF THE INVENTION

In the production of glass containers by the press and blow method on the well known I. S. type machine, a gob of glass is provided to a blank or parison mold comprising two mold members or halves. These mold halves are supported by opposed arms of a mold open and close mechanism at a blank station of the machine, which mold members can be closed to form a mold cavity. The glass in the mold cavity is pressed into the required shape of a parison by a plunger moving upwardly into the mold cavity, a lower portion of the glass being forced into a neck ring of the mold. The plunger is then withdrawn and the parison is carried by the neck ring away from the blank station and is transferred to a blow mold station where it is blown to the required shape. In the blow and blow method a gob of glass is provided to the parison mold and is then blown into the required shape of a parison. The shaped parison is again carried by a neckring away from the blank station to a blow mold station.

It will be understood that the mold members must be accurately located, i.e., there must be a datum from which their position is located with respect to other parts of the machine, particularly the plunger mechanism and the neck ring mechanism. Customarily each mold arm is made up of upper and lower hanger members and the mold halves include downwardly depending hooks which hang on these members with the location of the horizontal surface where the hook is supported defining the datum for the mold. Normally the hooks are located at the top of the mold half but GB 2175296 shows a variant construction in which the mold member has its vertical position determined by a lower hanger member.

Accurate location of the mold members is of course also required when one set of mold members is exchanged for another set of different size. Conventionally this is done by substituting the hanger members used with one set of molds by hanger members appropriate for the new set of molds. Such hanger members are fairly expensive, and what is more, if the mold arms are optimally positioned to close the molds with pressure applied to upper and lower end portions of the mold members in the case of mold members of one size, on substitution of the hanger members for another size of mold member the mold arms will no longer be so optimally positioned. This can allow for springing of the molds and the formation of seams on the container being made.

OBJECT OF THE INVENTION

It is accordingly an object of the present invention to provide a datum for the molds that will assure that the bottom face of the molds will engage the top face of the support as the bottom surface of the mold wears away to thereby assure that any cooling interconnections therebetween will have maximum efficiency throughout its use.

DETAILED DESCRIPTION OF THE PREFERRED EMBODIMENT

Figure 1:
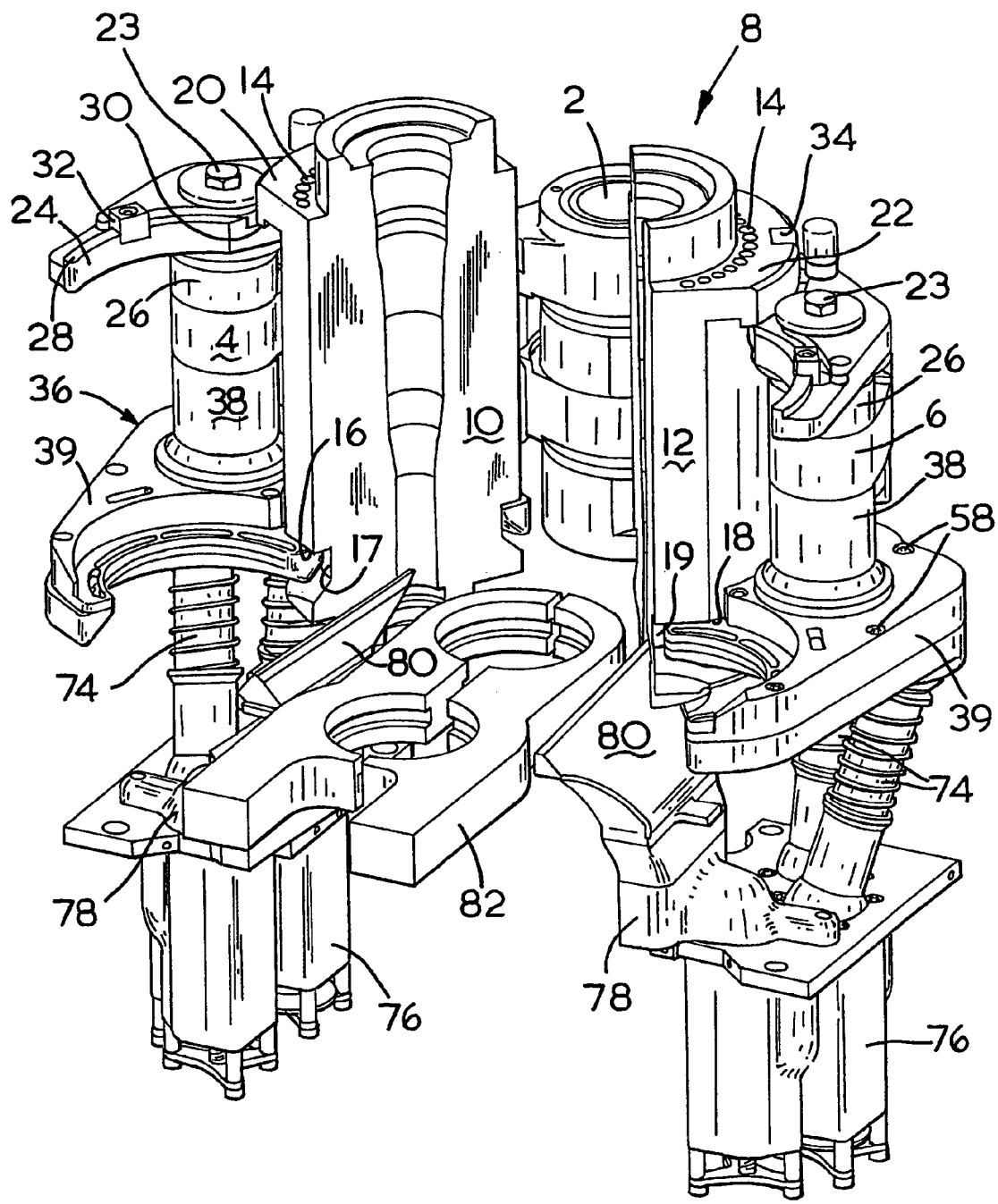
FIG. 1 shows a mold mechanism at a blank station of a double gob glassware forming machine with some parts omitted and with a pair of mold halves in the mechanism.
Figure 2:
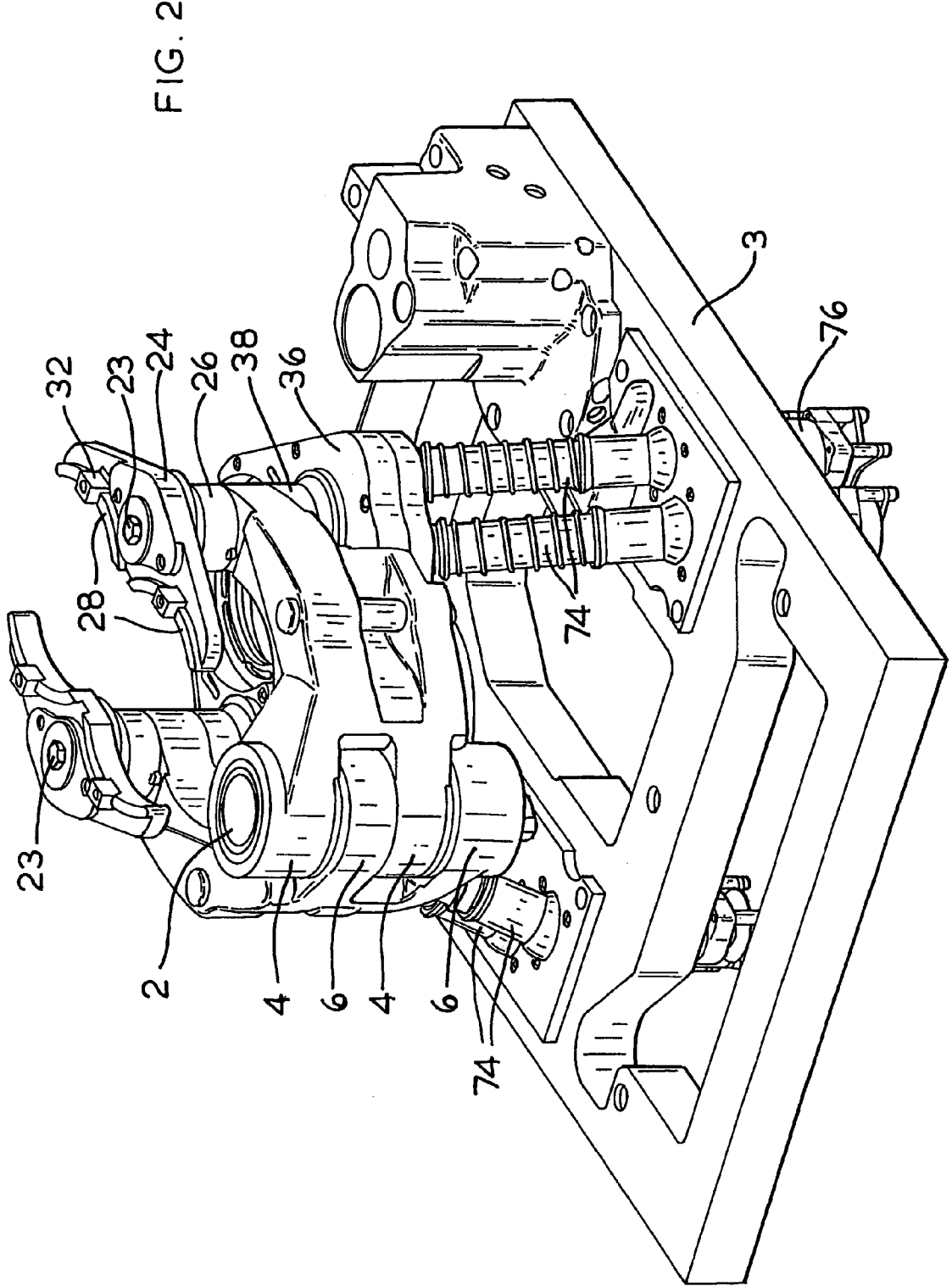
FIG. 2 shows a view similar to FIG. 1 but viewed from the other side of the mold mechanism.
Figure 3:
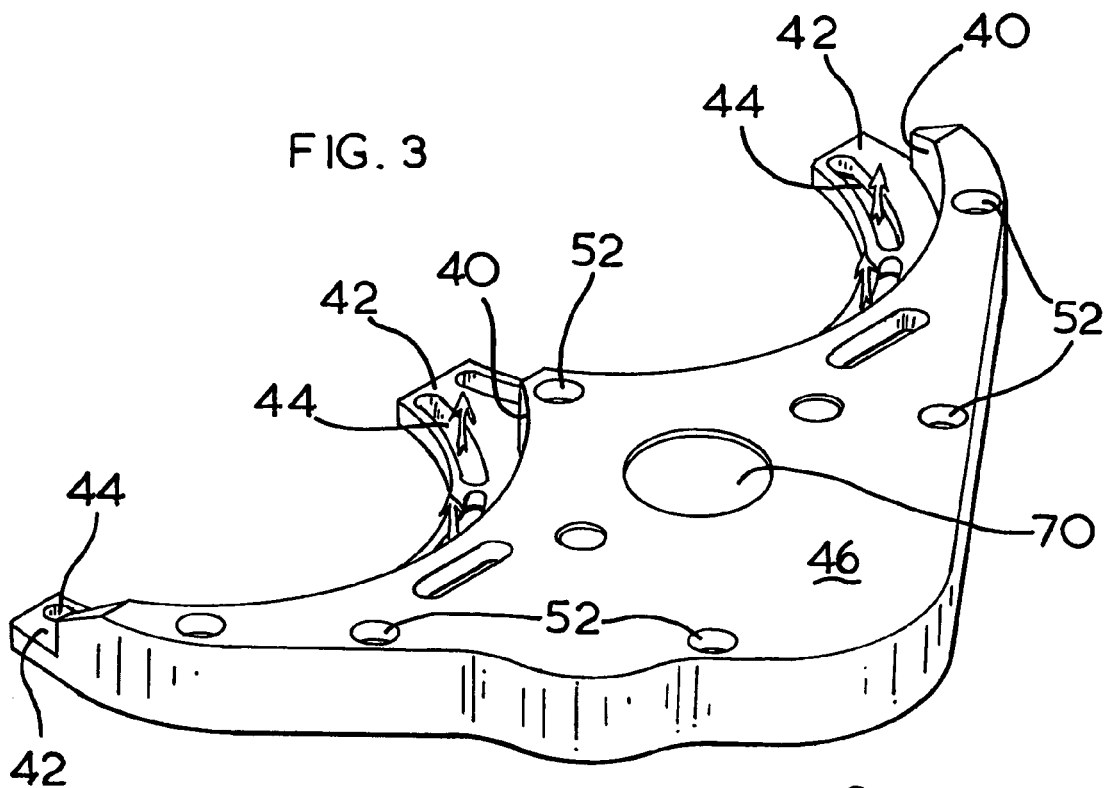
FIG. 3 shows a view of an upper portion of an air chamber member.
Figure 4:
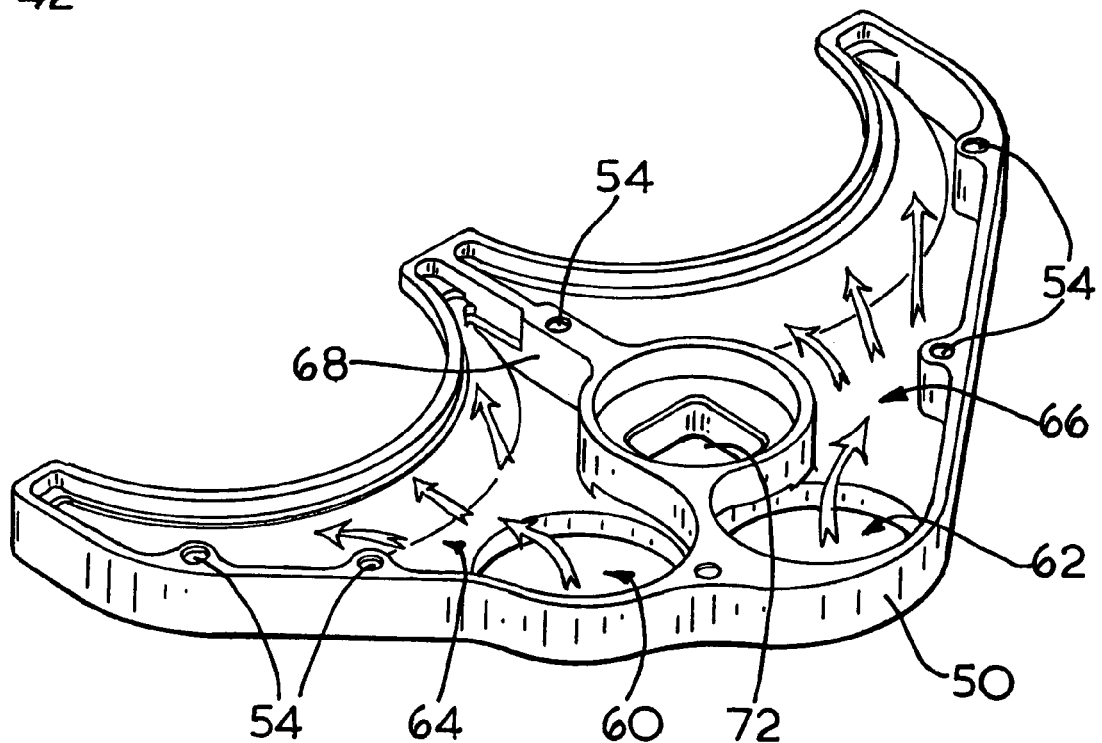
FIG. 4 shows a view of a lower portion of an air chamber member.

A multi gob glassware forming machine, specifically a double gob machine comprises a mold mechanism, FIGS. 1 & 2, mounted on a table 3 of the machine at a blank station of the machine. The mold mechanism comprises a pivot 2 fixed in the machine and two mold arms 4,6, mounted on the pivot 2 and adapted to support two blank molds, only one, 8, of which is shown in an open condition in FIG. 1. The blank mold 8 comprises two mold members 10,12, which are generally cylindrical in shape and each of which has straight cooling passages 14 extending axially through the mold member from a lower end face 16,18 to an upper end face 20,22 of the mold members. It can be seen that the lower end faces 16, 18 bound a recess 17, 19 extending round an outer face of a lower end portion of the mold members, and the cooling passages 14 open into the recesses 17, 19 when the mold members are in position. It will be understood that the mechanism illustrated is adapted to have two blank molds, i.e. four mold members, and that the mold members are all similar as are the means for supporting the mold members in the mold mechanism. While the mold open and close mechanism is illustrated in the double gob configuration, it could also be single or double gob.

The mold arm 4 supports, on a generally vertical support rod 23, an upper mold support 24, and a spacer 26 which determines the height of the upper mold support 24 with respect to the mold arm 4. The upper mold support 24 comprises two curved ridges 28, only one of which can be seen in FIG. 1. The corresponding hook or curved ridge 30 on the mold member will be located behind the curved ridge when the mold is in place. A block 32 secured to the support 24 engages with a corresponding slot (shown at 34 on the mold member 12) in the mold member 10 accurately to locate the mold member 10 in position on the support 24.

Figure 5:
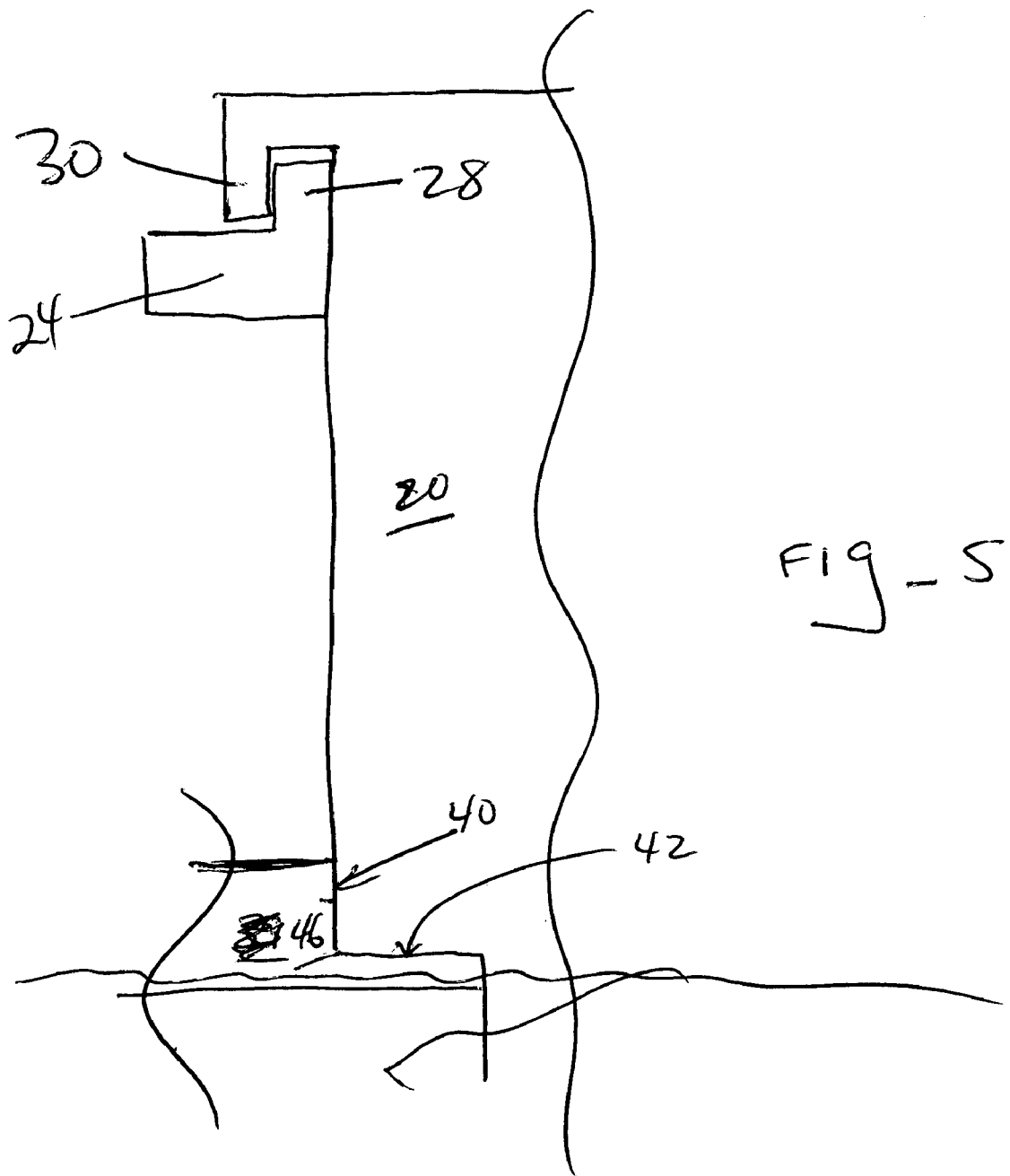
FIG. 5 is a diagrammatic sketch of how a mold half is supported by the upper and lower mold hangers.

The mold arm 4 also supports on the rod 23 a lower mold support 36 and a spacer 38 between the mold support 36 and the arm 4 which determines the height of the lower mold support 36 with respect to the mold arm 4. The lower mold support 36 defines an air plenum chamber 39 for the supported mold halves and serves not only to supply cooling air to the mold supported mold half but also to vertically locate the lower end portion of the mold member. The air chamber member 39 comprises an upper member 46 and a lower member 50 secured together by bolts 58 through holes 52 in the member 46 and 54 in the member 50. The lower member 50 is recessed and comprises two air inlets 60 and 62. The inlet 60 leads into a recess 64, the inlet 62 leads into a recess 66 separated from the recess 64 by a wall 68. The two members 46 and 50 when secured together provide two plenum chambers. By a plenum chamber we mean a chamber in which the entry to the chamber is sufficiently spaced from the exits to the chamber that a substantially uniform pressure is provided at the exits. The upper member 46 comprises two generally semicircular vertical surfaces 40 which are to be proximate the side wall of a supported mold. These vertical surfaces 40 are adjacent two horizontal supporting surfaces 42. The surfaces 42 are flat and generally semicircular in plan and have a series of curved apertures 44 formed in them which open into the plenum chambers formed by the recesses 64 and 66 and which are adapted to correspond with the cooling passages of the mold members, i.e. the passages 14 of the mold member 10 opening into the end face 16. When the mold member 10 is in position as shown in FIG. 5, it is positively located by the lower mold support. The chamber member 39 enters the recess 17, the bottom mold surface or face 16 engages the horizontal support surface 42, and the vertical surfaces 40 engage the outer circumference of the mold member. The apertures 44 are positioned so that they will be in communication with the lower ends of the cooling passages in the mold member. The hook 30 is spaced vertically from the ridge and upper support 24 and accordingly is not supported by the upper support. The mold is supported vertically at the bottom of the mold where the horizontal bottom surface of the mold 16 rests on the horizontal supporting surface of the upper portion 46 of the lower support.

It should be noted that when the machine is inactive and cold, the lower end faces 16 of the mold members may be slightly spaced away from the supporting surfaces 42, but on use of the machine the mold members get hot and expand, and the supporting surfaces 42 and the end faces 16 then come into contact. Further, as the machine is used, wear can occur between adjacent horizontal surfaces without interfering with the desired mating engagement between surfaces 40 and 16. The vertical dimension of spacers 26 and 38 are selected to locate these surfaces in engagement.

The upper member 46 has an aperture 70 which meets a corresponding aperture 72 in the lower member 50, and the support rod 23 passes through the apertures 70 and 72 to support the chamber member 39 against the spacer 38. The inlets 60,62 to each plenum chamber are connected by flexible air supply tubes 74 to air control cylinders 76, 76. Another cylinder 76 (not clearly shown) also support a manifold 78 which is also connected to a neck-ring cooling head 80 which directs cooling air onto a neck-ring mechanism 82 of the parison forming mechanism (only shown diagrammatically).

The mechanism according to the invention offers improved control over mold cooling. A separate adjustable air control in each air control cylinder 76 controls the supply of cooling air to the neck-ring cooling and to each of the plenum chambers independently. In general, in a blank mold mechanism, the molds near the mold pivot become hotter when the machine is in use than those further away from the pivot, and in the present construction the supply of cooling air to the two mold members can be adjusted to allow for this.

If it is desired to change the height of the mold member in the machine, the position of the mold member can be adjusted by choosing spacers 26, 38 of appropriate size. Such spacers, being effectively simple collars, are much less expensive than the mold hangers generally in use. Further it is possible to ensure that the clamping forces exerted on the mold members by the mold arms 4,6, are located near the end portions of the mold members. In other arrangements, a large mold member my have to extend upwards beyond the mold arms, thus leading to less effective clamping. When the mechanism of the present invention is in use, the bottom of the mold members are located on the lower mold support whatever expansion of the mold members because of heat may take place.

The invention claimed is:

1. A glassware forming machine comprising a parison mold mechanism at a blank station of the machine having opposed mold open and closed mechanisms for supporting opposed blank mold halves, each blank mold half including a downwardly depending hook to positively retain the blank mold half on the associated mold open and close mechanism and a flat bottom horizontal surface, each of said mold open and close mechanisms including a mold arm mounted for horizontal displacement between a retracted position and an advanced mold clamping position, a first spacer supported by said mold arm, an upper mold hanger supported by said first spacer, a second spacer below and engaging said mold arm, a lower mold hanger below and engaging said second spacer, and clamping means to clamp said upper mold hanger, first spacer, mold arm, second spacer and lower mold hanger together, said upper mold hanger including ridge means for operative association with the hook of a blank mold half, said lower mold hanger including a horizontal top surface for supporting the bottom surface of a mold half, and the vertical dimension of said first and second spacers being selected so that the bottom surface of a supported blank mold half will engage the horizontal top surface of the lower mold hanger and so that the hook of a supported blank mold half will be vertically spaced from the upper mold hanger.

2. A machine according to claim 1 in which the horizontal top surface of the lower mold hanger comprises a flat generally semi-circular supporting surface adjacent a generally semi-circular vertical locating surface.

3. A machine according to claim 2 in which the lower mold hanger comprises an air chamber member having a plenum chamber having a series of upwardly facing apertures formed in the semi-circular supporting surface.

* * * * *

UNITED STATES PATENT AND TRADEMARK OFFICE
CERTIFICATE OF CORRECTION

PATENT NO. : 7,596,969 B2  Page 1 of 1
APPLICATION NO. : 10/424510
DATED : October 6, 2009
INVENTOR(S) : Willi Meyer and Thomas Mueller It is certified that error appears in the above-identified patent and that said Letters Patent is hereby corrected as shown below:

Sheet 4 of 4
--The below formal Fig. 5 replaces the informal Fig. 5--

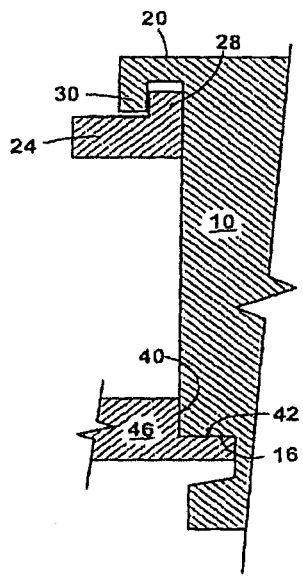

FIG. 5

Signed and Sealed this

Twenty-third Day of November, 2010

David J. Kappos
*Director of the United States Patent and Trademark Office*